(12) United States Patent
Wu et al.

(10) Patent No.: US 12,482,135 B2
(45) Date of Patent: Nov. 25, 2025

(54) CAMERA CALIBRATION METHOD AND APPARATUS, COMPUTER DEVICE, STORAGE MEDIUM, AND PROGRAM PRODUCT

(71) Applicant: CONTEMPORARY AMPEREX TECHNOLOGY (HONG KONG) LIMITED, Hong Kong (CN)

(72) Inventors: Qian Wu, Ningde (CN); Jiwei Chen, Ningde (CN); Guannan Jiang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 168 days.

(21) Appl. No.: 18/499,238

(22) Filed: Nov. 1, 2023

(65) Prior Publication Data

US 2024/0062422 A1    Feb. 22, 2024

Related U.S. Application Data

(63) Continuation of application No. PCT/CN2023/084760, filed on Mar. 29, 2023.

(30) Foreign Application Priority Data

Aug. 3, 2022 (CN) .......................... 202210927687.8

(51) Int. Cl.
*G06T 7/80* (2017.01)
*H04N 23/60* (2023.01)

(52) U.S. Cl.
CPC ............... *G06T 7/80* (2017.01); *H04N 23/64* (2023.01)

(58) Field of Classification Search
CPC . G06F 3/16; G06F 3/00; G06F 3/0488; G06F 3/01; G06F 21/60; G06F 21/64;
(Continued)

(56) References Cited

U.S. PATENT DOCUMENTS

| 2008/0130985 A1* | 6/2008 | Park | G06T 7/73 382/154 |
| 2012/0127324 A1* | 5/2012 | Dickins | G09G 3/006 348/191 |

(Continued)

FOREIGN PATENT DOCUMENTS

| CN | 109448062 A | 3/2019 |
| CN | 110246187 A | 9/2019 |

(Continued)

OTHER PUBLICATIONS

The extended European search report received in the corresponding European Application 23790527.8, mailed on Sep. 17, 2024.
(Continued)

*Primary Examiner* — Rayeez R Chowdhury
(74) *Attorney, Agent, or Firm* — K&L Gates LLP

(57) ABSTRACT

The present application relates to a camera calibration method and apparatus, a computer device, a storage medium, and a program product. The method includes: obtaining a first operation instruction based on a camera calibration interface; determining, from configuration information, target configuration information matching the first operation instruction and set based on the camera calibration interface; and then executing a corresponding operation in a camera calibration process based on the first operation instruction and the target configuration information. However, the camera calibration process provided by embodiments of the present application is implemented based on the camera calibration interface, without switching back and (Continued)

forth between a plurality of tools, thereby making the camera calibration process less cumbersome.

20 Claims, 8 Drawing Sheets

(58) Field of Classification Search
CPC ....... G06F 16/9537; G06T 7/80; G06T 15/20; G06T 11/60; G06T 19/00; G06T 7/521; G06T 7/70; G06T 7/73; G06T 9/00; G06T 7/00; G06T 7/246; G06T 7/32; G06T 7/33; G06T 7/514; G06T 7/593; G06T 1/00; G06T 3/00; G06T 3/047; G06T 5/00; G06T 5/80; G06T 7/187
See application file for complete search history.

(56) References Cited

U.S. PATENT DOCUMENTS

| | | | | |
|---|---|---|---|---|
| 2012/0314030 | A1* | 12/2012 | Datta | G06T 7/20 348/44 |
| 2013/0083168 | A1* | 4/2013 | Kim | G03B 43/00 348/E13.016 |
| 2015/0009183 | A1* | 1/2015 | Ling | G06F 3/0304 345/175 |
| 2017/0287166 | A1* | 10/2017 | Claveau | G06T 7/80 |
| 2017/0295358 | A1* | 10/2017 | Cabral | H04N 17/002 |
| 2018/0352217 | A1* | 12/2018 | Sato | H04N 17/002 |
| 2019/0196708 | A1* | 6/2019 | Donelli | G06F 3/0412 |
| 2020/0027242 | A1* | 1/2020 | Koyama | H04N 17/002 |
| 2020/0134872 | A1* | 4/2020 | Feng | H04N 23/661 |
| 2023/0162437 | A1* | 5/2023 | Ito | G06V 20/64 345/419 |

FOREIGN PATENT DOCUMENTS

| | | | | |
|---|---|---|---|---|
| CN | 110555887 | A | | 12/2019 |
| CN | 110689583 | A | | 1/2020 |
| CN | 114549658 | A * | 5/2022 | ............... G06T 7/80 |
| CN | 114549664 | A | | 5/2022 |
| CN | 216484770 | U | | 5/2022 |
| CN | 114820810 | A | | 7/2022 |
| CN | 115830133 | A | | 3/2023 |
| JP | 2011047739 | A | | 3/2011 |

OTHER PUBLICATIONS

International Search Report received in the corresponding International Application PCT/CN2023/084760, mailed Jun. 23, 2023.
First office action in the corresponding Chinese Application 202210927687.8, issued May 30, 2023.
Zhang, Lei, "Design and Implementation of an Image Acquisition and Calibration System Based on MFC Stripe Camera", issued Dec. 15, 2015.

* cited by examiner

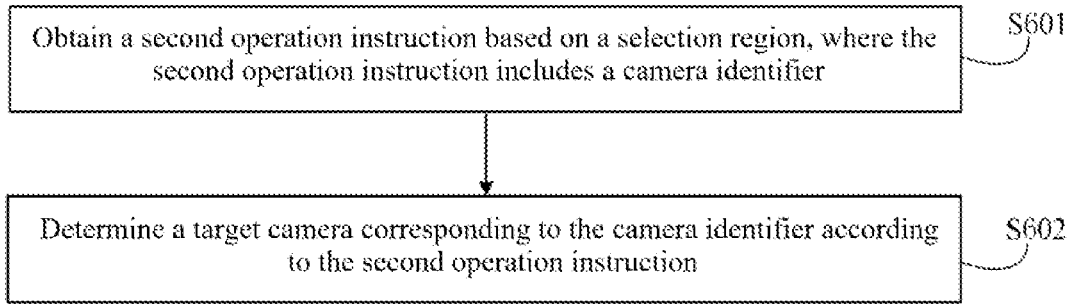
FIG. 5
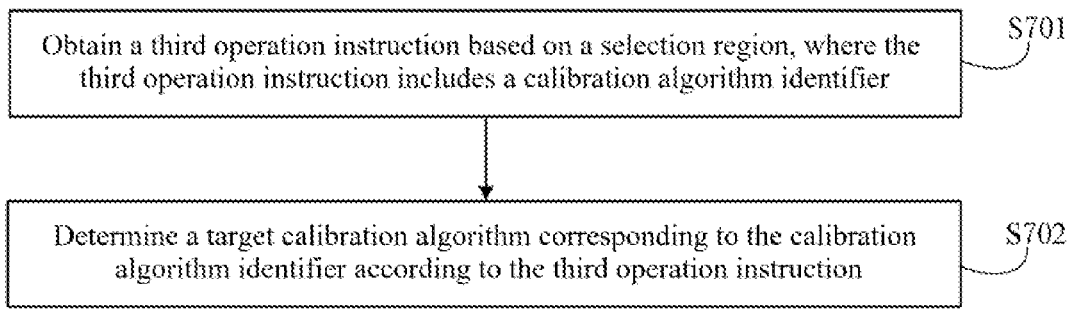
FIG. 6
FIG. 7

CAMERA CALIBRATION METHOD AND APPARATUS, COMPUTER DEVICE, STORAGE MEDIUM, AND PROGRAM PRODUCT

CROSS-REFERENCE TO RELATED APPLICATIONS

The present application is a continuation of international application PCT/CN2023/084760, filed Mar. 29, 2023, which claims priority to Chinese Patent Application No. 202210927687.8, filed on Aug. 3, 2022 and entitled "CAMERA CALIBRATION METHOD AND APPARATUS, COMPUTER DEVICE, STORAGE MEDIUM, AND PROGRAM PRODUCT", which is incorporated herein by reference in its entirety.

TECHNICAL FIELD

The present application relates to the field of camera calibration technologies, and in particular, to a camera calibration method and apparatus, a computer device, a storage medium, and a program product.

BACKGROUND ART

Whether in image measurement or machine vision applications, camera calibration is a very critical link. An objective of calibration of a camera is to obtain calibration results such as intrinsic parameters, extrinsic parameters, and distortion parameters of the camera. The precision of calibration results directly affects the accuracy of work results of the camera.

Currently, during calibration of a camera, it is necessary to communicatively connect the camera to a computer device, manually operate a camera client installed on the computer device to trigger the camera to capture an image, manually operate the camera client to save the captured image to a local specified path, and then manually open a third-party calibration tool on the computer device to process the image to obtain a calibration result.

However, an existing camera calibration method has the problem of cumbersome operations.

SUMMARY OF THE INVENTION

In view of the above, it is necessary to address the above technical problem and provide a camera calibration method and apparatus, a computer device, a storage medium, and a program product that can make user operations in a camera calibration process less cumbersome and reduce a time spent in the camera calibration process.

According to a first aspect, the present application provides a camera calibration method. The method includes:

obtaining a first operation instruction based on a camera calibration interface;

determining target configuration information matching the first operation instruction from configuration information, where the configuration information is set based on the camera calibration interface; and executing a corresponding operation in a camera calibration process based on the first operation instruction and the target configuration information.

An existing camera calibration method requires switching between a camera client and a third-party calibration tool, while in this embodiment of the present application, the camera calibration process provided in this embodiment of the present application is implemented based on the camera calibration interface, without switching back and forth between a plurality of tools, thereby making the camera calibration process less cumbersome. In addition, based on preset configuration information and the first operation instruction, the corresponding operation in the camera calibration process can be implemented, and camera calibration can be repeatedly performed based on the set configuration information, without the need to set the configuration information before each camera calibration, thereby reducing human intervention. Moreover, in the camera calibration process in this embodiment of the present application, it does not need to manually operate a camera client to save a captured image to a local specified path, nor does it need to manually open a third-party calibration tool. Instead, a corresponding operation of camera calibration may be performed based on the first operation instruction and target configuration information. This further makes user operations less cumbersome and reduces a time spent in the camera calibration process.

In some embodiments, the camera calibration interface includes a functional region, and the functional region includes a plurality of trigger controls with different functions; and the obtaining a first operation instruction based on a camera calibration interface includes:

obtaining the first operation instruction in response to a first trigger operation on a target control in the functional region, where the target control is any one of the plurality of trigger controls with different functions.

In some embodiments, the method further includes any one of the following:

if the target control is a capture control, the first operation instruction is a capture instruction;

if the target control is a remove control, the first operation instruction is a delete instruction;

if the target control is a save control, the first operation instruction is a save instruction; and if the target control is a calibration control, the first operation instruction is a calibration instruction.

In this embodiment of the present application, based on the same camera calibration interface, the user can implement a plurality of operations, such as an operation of capturing an image, an operation of deleting an image, an operation of saving an image, and a calibrating operation, without the need of switching between the camera client and the third-party calibration tool, so that the complexity of the operation is reduced, and the whole process is easy to operate.

In some embodiments, the executing a corresponding operation in a camera calibration process based on the first operation instruction and the target configuration information includes any one of the following:

controlling, based on the capture instruction and first target configuration information corresponding to the capture instruction, a target camera to capture an image, where the first target configuration information includes a parameter of the target camera;

deleting an image to be deleted based on the delete instruction and second target configuration information corresponding to the delete instruction, where the second target configuration information includes information about the image to be deleted;

saving an image to be saved based on the save instruction and third target configuration information corresponding to the save instruction, where the third target configuration information includes information about and a save path of the image to be saved; and calibrating the target camera based on the calibration instruction and fourth target configuration information corresponding to the calibration instruction, to obtain and save a calibrated parameter of the target camera, where the fourth target configuration information includes a target calibration algorithm.

In this embodiment of the present application, after the target camera is calibrated to obtain the calibrated parameter of the target camera, a generated intrinsic parameter file, extrinsic parameter file, and map file can be automatically saved in a file save path set in the fourth target configuration information based on the file save path. Therefore, there is no need to manually save the calibrated parameter in a specified path. This further reduces the complexity of the manual operation of the camera calibration process, and avoids the problem of copying errors that may result from manually copying the calibrated parameter to the specified path.

In some embodiments, the camera calibration interface includes a selection region; and the method further includes:

obtaining a second operation instruction based on the selection region, where the second operation instruction includes a camera identifier; and determining a target camera corresponding to the camera identifier according to the second operation instruction.

In this embodiment of the present application, the second operation instruction including the camera identifier is obtained based on the selection region, and the target camera corresponding to the camera identifier is determined according to the second operation instruction, so that it is convenient for the user to select the target camera to be calibrated. It should be noted that, after the user selects the target camera, the user may click on a camera connection control corresponding to the target camera, so as to establish a communication connection to the target camera.

In some embodiments, the method further includes:

obtaining a third operation instruction based on the selection region, where the third operation instruction includes a calibration algorithm identifier; and determining a target calibration algorithm corresponding to the calibration algorithm identifier according to the third operation instruction.

In this embodiment of the present application, the third operation instruction including the calibration algorithm identifier is obtained based on the selection region, and the target calibration algorithm corresponding to the calibration algorithm identifier is determined according to the third operation instruction, so that it is convenient for the user to select a calibration algorithm actually needed, and an implementation that flexibly adjusts the calibration algorithm and has stronger scenario applicability is provided.

In some embodiments, the camera calibration interface further includes a setting control, and the method further includes:

displaying a setting interface in response to a second trigger operation on the setting control; and obtaining the configuration information based on the setting interface.

In some embodiments, if the camera calibration process is used to calibrate a single camera, the setting interface includes at least one of a description file name setting bar, a calibration target image file name setting bar, a file save path setting bar, an intrinsic parameter file name setting bar, an extrinsic parameter file name setting bar, a map file name setting bar, a thickness setting bar, a single-pixel width setting bar, a single-pixel height setting bar, a focal length setting bar, an average filter length and width setting bar, and a calibration target feature angle direction setting bar.

In some embodiments, if the camera calibration process is used to calibrate dual cameras, the setting interface includes at least one of a description file name setting bar, an intrinsic parameter file name setting bar of a first camera, an intrinsic parameter file name setting bar of a second camera, a map file name setting bar of the first camera, a map file name setting bar of the second camera, a calibration target height setting bar, a target object height setting bar, a calibration target center distance setting bar, an initial resolution setting bar, an edge removal percentage setting bar, an overlapping percentage setting bar, an average filter length and width setting bar, and a calibration target feature angle direction setting bar.

In some embodiments, the camera calibration interface further includes an image display region, and the image display region is used to display an image captured by the target camera and/or a calibration result image.

In some embodiments, the camera calibration interface further includes an image information display region, and the image information display region is used to display at least one of a logo, a pixel error, and a status of an image captured by the target camera.

In this embodiment of the present application, the image information display region is used to display at least one of a logo, a pixel error, and a status of an image captured by the target camera, so that the user can delete an image with quality not meeting a preset quality condition based on the pixel error, it is ensured that the computer device can perform camera calibration based on an image meeting the preset quality condition, so that the quality of images participating in the camera calibration is high, thereby improving the accuracy of camera calibration results.

In some embodiments, the camera calibration interface further includes a calibration result control; and the method further includes:

displaying a calibration result interface in response to a second trigger operation on the calibration result control, where the calibration result interface is used to display the calibrated parameter of the target camera.

In this embodiment of the present application, the calibration result interface is displayed, so that it is convenient for the user to check the calibrated parameter of the target camera.

According to a second aspect, the present application further provides a camera calibration apparatus. The apparatus includes:

an obtaining module configured to obtain a first operation instruction based on a camera calibration interface;

a determination module configured to determine target configuration information matching the first operation instruction from configuration information, where the configuration information is set based on the camera calibration interface; and an execution module configured to execute a corresponding operation in a camera calibration process based on the first operation instruction and the target configuration information.

According to a third aspect, the present application further provides a computer device. The computer device includes a memory and a processor, the memory stores a computer program, and the processor executes the computer program to implement the steps of the method provided in the foregoing embodiments.

According to a fourth aspect, the present application further provides a computer-readable storage medium. The computer-readable storage medium has stored thereon a computer program that, when executed by a processor, implements the steps of the method provided in the foregoing embodiments.

According to a fifth aspect, the present application further provides a computer program product. The computer program product includes a computer program that, when executed by a processor, implements the steps of the method provided in the foregoing embodiments.

According to the foregoing camera calibration method and apparatus, computer device, storage medium, and program product, the first operation instruction is obtained based on the camera calibration interface; the target configuration information matching the first operation instruction and set based on the camera calibration interface is determined from the configuration information; and then the corresponding operation in the camera calibration process is executed based on the first operation instruction and the target configuration information. An existing camera calibration method requires switching between a camera client and a third-party calibration tool, while the camera calibration process provided in this embodiment of the present application is implemented based on the camera calibration interface, without switching back and forth between a plurality of tools, thereby making the camera calibration process less cumbersome. In addition, based on preset configuration information and the first operation instruction, the corresponding operation in the camera calibration process can be implemented, and camera calibration can be repeatedly performed based on the set configuration information, without the need to set the configuration information before each camera calibration, thereby reducing human intervention. Moreover, in the camera calibration process in this embodiment of the present application, it does not need to manually operate a camera client to save a captured image to a local specified path, nor does it need to manually open a third-party calibration tool. Instead, a corresponding operation of camera calibration may be performed based on the first operation instruction and target configuration information. This further makes user operations less cumbersome and reduces a time spent in the camera calibration process.

The above description is only an overview of the technical solutions of the present application. In order to more clearly understand the technical means of the present application to implement same according to the contents of the description, and in order to make the above and other objectives, features and advantages of the present application more obvious and understandable, specific implementations of the present application are exemplarily described below.

BRIEF DESCRIPTION OF THE DRAWINGS

Various other advantages and benefits will become apparent to those of ordinary skill in the art upon reading the following detailed description of the embodiments. The accompanying drawings are merely for the purpose of illustrating the embodiments, and are not to be construed as limiting the present application. Moreover, like components are denoted by like reference numerals throughout the accompanying drawings. In the drawings:

FIG. 5 is a schematic diagram 2 of a setting interface of configuration information according to an embodiment of the present application;

FIG. 6 is a schematic flowchart of a target camera determining method according to an embodiment of the present application;

FIG. 7 is a schematic flowchart of a target calibration algorithm determining method according to an embodiment of the present application;

DETAILED DESCRIPTION OF EMBODIMENTS

Figure 1:
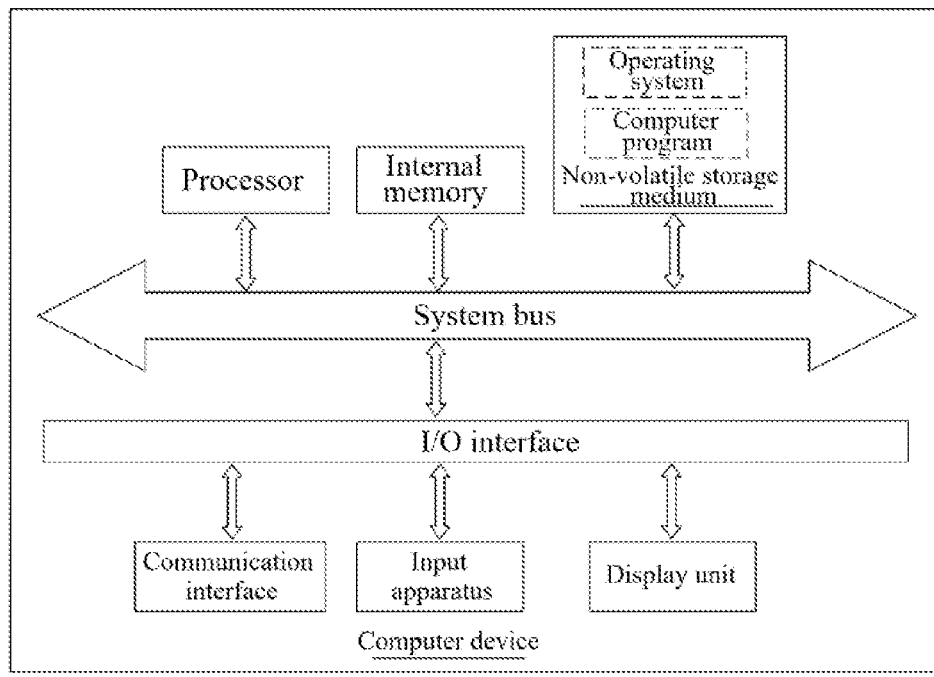
FIG. 1 is a diagram of an internal structure of a computer device according to an embodiment.

Embodiments of the technical solutions of the present application will be described in detail below with reference to the accompanying drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "including" and "having" and any variations thereof in the description and the claims of the present application as well as the brief description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the indicated technical features. In the description of the embodiments of the present application, the phrase "a plurality of" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships can exist, for example, A and/or B can include: only A exists, both A and B exist, and only B exists. In addition, the character "/" herein generally indicates an "or" relationship between the associated objects.

In the description of the embodiments of the present application, the term "a plurality of" means two or more (including two), similarly the term "a plurality of groups" means two or more groups (including two groups), and the term "a plurality of pieces" means two or more pieces (including two pieces).

In the description of the embodiments of the present application, the orientation or position relationship indicated by the technical terms "central", "longitudinal", "transverse", "length", "width", "thickness", "upper", "lower", "front"; "rear", "left", "right", "vertical", "horizontal", "top", "bottom", "inner", "outer", "clockwise", "counter-clockwise", "axial", "radial", "circumferential", etc. are based on the orientation or position relationship shown in the accompanying drawings and are merely intended to facilitate and simplify the description of the embodiments of the present application, rather than indicating or implying that the apparatus or element considered must have a particular orientation or be constructed and operated in a particular orientation, and therefore not to be construed as limiting the embodiments of the present application.

In the description of the embodiments of the present application, unless otherwise explicitly specified and defined, the technical terms such as "install", "couple", "connect", and "fix" should be understood in a broad sense, for example, they may be a fixed connection, a detachable connection, or an integrated connection; may be a mechanical connection or an electric connection; and may be a direct connection or an indirect connection by means of an intermediate medium, or may be communication between interiors of two elements or interaction between the two elements. For those of ordinary skill in the art, the specific meanings of the above terms in the embodiments of the present application can be understood according to specific situations.

Currently, during calibration of a camera, it is necessary to communicatively connect the camera to a computer device, manually operate a camera client installed on the computer device to trigger the camera to capture an image, manually operate the camera client to save the captured image to a local specified path, and then manually open a third-party calibration tool on the computer device to process the image to obtain a calibration result. However, an existing camera calibration method has the problem of cumbersome operations.

To solve the foregoing technical problem, the embodiment of the present application provides detection software applied to industrial vision, the software can provide a convenient visual interface to assist debugging personnel in completing the camera calibration, thereby simplifying the camera calibration process, and achieving the desired detection accuracy.

In an embodiment, a computer device is provided. The computer device may be a terminal, and the internal structure of the computer device may be shown in FIG. 1. The computer device includes a processor, a memory, a communication interface, a display, and an input apparatus connected through a system bus. The processor of the computer device is configured to provide calculation and control capabilities. The memory of the computer device includes a non-volatile storage medium and an internal memory. The non-volatile storage medium stores an operating system and a computer program. The internal memory provides an environment for operation of the operating system and the computer program in the non-volatile storage medium. The communication interface of the computer device is used for wired or wireless communication with an external terminal, and the wireless communication can be implemented through WiFi, a mobile cellular network, near field communication (NFC), or other technologies. A camera calibration method is implemented when the computer program is executed by the processor. The display of the computer device may be a liquid crystal display or an electronic ink display, and the input apparatus of the computer device may be a touch layer covered on the display, or may be a button, a trackball, or a touch pad provided on a housing of the computer device, or may be an external keyboard, touch pad, or mouse.

Those skilled in the art can understand that the structure shown in FIG. 1 is only a block diagram of a partial structure related to the solution of the present application, and does not constitute a limitation to the computer device on which the solution of the present application is applied. A specific computer device may include more or fewer components than those shown in the figure, or may combine some components, or have a different arrangement of components.

Figure 2:
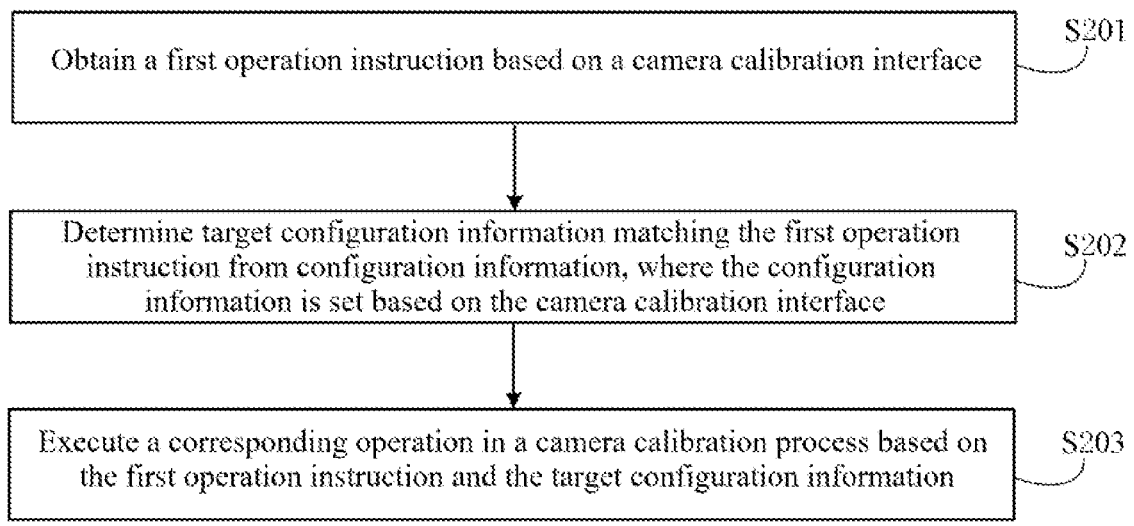
FIG. 2 is a schematic flowchart of a camera calibration method according to an embodiment of the present application.

In an embodiment, FIG. 2 is a schematic flowchart of a camera calibration method according to an embodiment of the present application. The method is applied to the computer device shown in FIG. 1, and the method includes the following steps:

In S201, a first operation instruction is obtained based on a camera calibration interface.

In this embodiment of the present application, the camera calibration interface can be used for camera calibration, and can be used for calibration of a single camera and dual cameras. The camera calibration interface may include a single-camera calibration interface and a dual-camera calibration interface. When the camera calibration interface is a single-camera calibration interface, the camera calibration interface may be used to calibrate a single camera. When the camera calibration interface is a dual-camera calibration interface, the camera calibration interface may be used to calibrate dual cameras.

The first operation instruction may be a capture instruction or a display instruction. When the first operation instruction is a capture instruction, the computer device may control, according to the capture instruction, the camera to capture an image. When the first operation instruction is a display instruction, the computer device may display an image captured by the camera.

Figure 3:
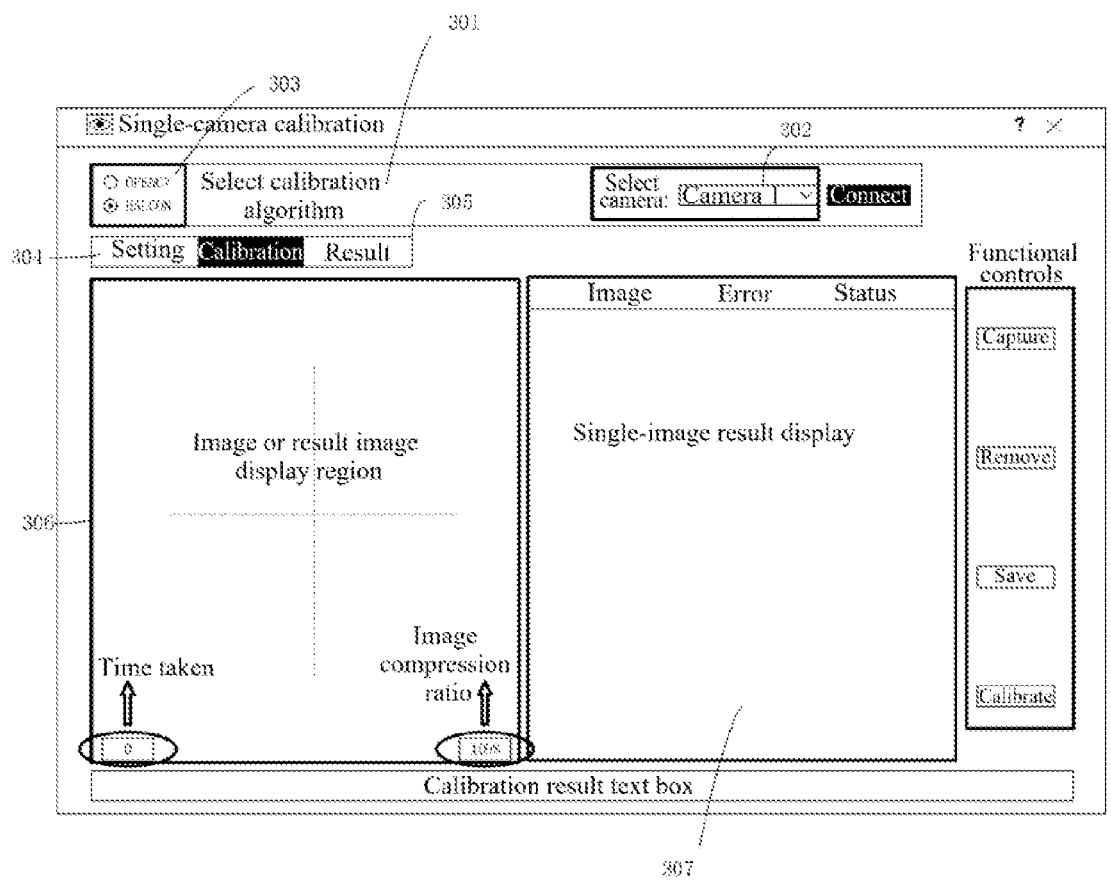
FIG. 3 is a schematic diagram 1 of a single-camera calibration interface according to an embodiment of the present application.

To introduce the embodiment of the present application more clearly, a single-camera calibration interface is used as an example for description. FIG. 3 is a schematic diagram 1 of a single-camera calibration interface according to an embodiment of the present application. A user may trigger the first operation instruction through the camera calibration interface, for example, perform a trigger operation such as a click or double-click on functional controls on the single-camera calibration interface. Correspondingly, in response to a trigger operation of the user on the functional controls, the computer device can obtain a corresponding first operation instruction. The functional controls are, for example, a capture control, a remove control, a save control, and a calibration control shown in FIG. 3. The functional controls may be separate controls arranged in order shown in FIG. 3, or may be implemented by using a drop-down menu.

In S202, target configuration information matching the first operation instruction is determined from configuration information. The configuration information is set based on the camera calibration interface.

For the single-camera calibration interface, the configuration information includes, for example, a set calibration algorithm, a selected target camera, a description file name of a calibration target, an image file name of a calibration target (PostScript file name), a file save path, an intrinsic parameter file name, an extrinsic parameter file name, a map file name, a calibration target thickness, a single-pixel width, a single-pixel height, a focal length, an average filter length and width, a feature angle direction, and other information. The configuration information may be pre-stored in the computer device in a form of a configuration file, and the user may modify the configuration information in the configuration file. The configuration information may be alternatively information set based on a setting interface.

Exemplarily, if the calibration algorithm is a HALCON algorithm, a format of the description file may be in a .descrd format, and if the calibration algorithm is OPENCV, a format of the description file may be in a .xml format. When the HALCON algorithm is used, a PostScript file name may be set at the same time, and a file format of a PostScript file can be a .Ps format. The file save path refers to a save directory of calibration results generated after the calibration, to be specific, intrinsic parameter files, extrinsic parameter files, and map files included in the calibration results are saved in this directory.

Figure 4:
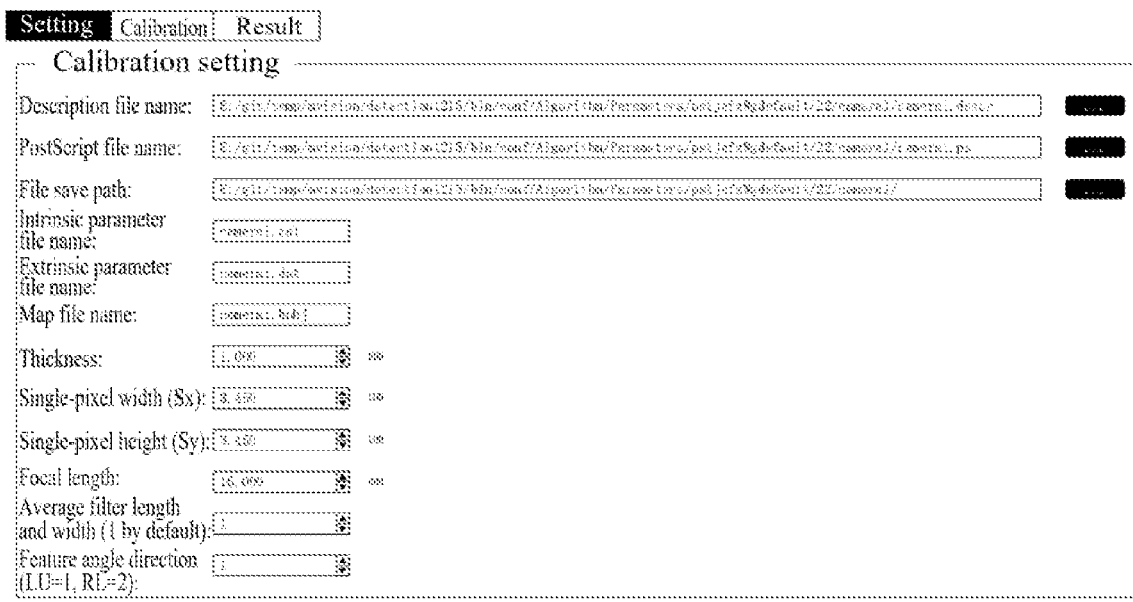
FIG. 4 is a schematic diagram 1 of a setting interface of configuration information according to an embodiment of the present application.

It should be noted that the configuration information can be displayed on a screen of the computer device, and for a display form, reference may be to the interfaces shown in FIG. 4 and FIG. 5. FIG. 4 is a schematic diagram 1 of a setting interface of configuration information according to an embodiment of the present application, and FIG. 5 is a schematic diagram 2 of a setting interface of configuration information according to an embodiment of the present application. FIG. 4 and FIG. 5 are schematic diagrams of a setting interface corresponding to a single-camera calibration process. Through the setting interface shown in FIG. 4, information such as a description file name, a calibration target image file name, and a file save path can be set, and through the setting interface shown in FIG. 5, related parameter information of a calibration target may be set, such as a number of mark points in an X direction, a number of mark points in a Y direction, a distance between two mark points, a ratio, a horizontal dimension of a black and white grid of the calibration target, and a vertical dimension of the black and white grid of the calibration target. The parameter information of the calibration target to be set corresponds to the selected calibration algorithm. For example, if the selected calibration algorithm is HALCON, the number of mark points in the X direction, the number of mark points in the Y direction, the distance between two mark points, and information about a ratio of a diameter of a mark point to the distance need to be set; if the selected calibration algorithm is OPENCV, the horizontal dimension of the black and white grid of the calibration target and the vertical dimension of the black and white grid of the calibration target need to be set.

In S203, a corresponding operation in a camera calibration process is executed based on the first operation instruction and the target configuration information.

In this embodiment of the present application, the camera calibration process includes, for example, an image capturing phase, an image saving phase, and a camera calibration phase. For the image capturing phase, the first operation instruction is a capture instruction, and is used to perform an image capturing operation. For the camera calibration phase, the first operation instruction is a calibration instruction, and is used to perform calibration on a camera.

Exemplarily, if the first operation instruction is a capture instruction, first target configuration information may include a selected target camera and a parameter of the target camera, and the parameter of the target camera may include a width of a single pixel, a height of a single pixel, a focal length, an average filter length and width, and other information that are of the target camera.

With reference to the foregoing examples, if the first operation instruction is a capture instruction, the target camera starts image capturing, and performs capturing operations in a single-camera calibration process based on the captured image and the target configuration information. After performing the capturing operation, for example, after performing the capturing operation for a preset duration, the computer device may perform single-camera calibration based on the image captured within the preset duration and the target configuration information.

It should be noted that after the capturing operation is performed, the user can click on the calibration control to trigger a calibration instruction, and perform a single-camera calibration operation based on the calibration instruction and the target configuration information corresponding to the calibration instruction. The target configuration information corresponding to the calibration instruction includes, for example, a calibration algorithm, a selected target camera, a description file name of a calibration target, an image file name of a calibration target (PostScript file name), a file save path, an intrinsic parameter file name, an extrinsic parameter file name, a map file name, a calibration target thickness, a single-pixel width, a single-pixel height, a focal length, an average filter length and width, a calibration target feature angle direction, and other information. Different camera calibration processes correspond to different first operation instructions and different target configuration information.

In the camera calibration method provided in this embodiment of the present application, the first operation instruction is obtained based on the camera calibration interface; the target configuration information matching the first operation instruction and set based on the camera calibration interface is determined from the configuration information; and then the corresponding operation in the camera calibration process is executed based on the first operation instruction and the target configuration information. An existing camera calibration method requires switching between a camera client and a third-party calibration tool, while the camera calibration process provided in this embodiment of the present application is implemented based on the camera calibration interface, without switching back and forth between a plurality of tools, thereby making the camera calibration process less cumbersome. In addition, based on preset configuration information and the first operation instruction, the corresponding operation in the camera calibration process can be implemented, and camera calibration can be repeatedly performed based on the set configuration information, without the need to set the configuration information before each camera calibration, thereby reducing human intervention. Moreover, in the camera calibration process in this embodiment of the present application, it does not need to manually operate a camera client to save a captured image to a local specified path, nor does it need to manually open a third-party calibration tool. Instead, a corresponding operation of camera calibration may be performed based on the first operation instruction and target configuration information. This further makes user operations less cumbersome and reduces a time spent in the camera calibration process.

Further, in some current camera calibration solutions, there is a drive mechanism to drive a calibration object to rotate to a target location. When the calibration object rotates to the target location, a camera to be calibrated is controlled to capture an image, and then a camera calibration operation is performed based on the captured image. The solutions have the problem of high dependence on hardware conditions such as a controller and a drive mechanism, and industrial vision application sites may not have hardware such as a controller and a drive mechanism, which makes it impossible to perform camera calibration. However, in this embodiment of the present application, a corresponding operation in the camera calibration process may be executed based on the first operation instruction and target configuration information, without deploying hardware devices such as a controller and a drive mechanism, thereby solving the following problem: industrial vision application sites may not have hardware such as a controller and a drive mechanism, which makes it impossible to perform camera calibration.

In some of the embodiments, the camera calibration interface includes a functional region, and the functional region includes a plurality of trigger controls with different functions; and the obtaining a first operation instruction based on a camera calibration interface includes:
  obtaining the first operation instruction in response to a first trigger operation on a target control in the functional region, where the target control is any one of the plurality of trigger controls with different functions.

As shown in FIG. 3, the target control in the functional region may be a capture control, a remove control, a save control, and a calibration control. The first trigger operation may be a single-click operation on the target control, or may be a double-click operation on the target control or the like.

In some embodiments, if the target control is a capture control, the first operation instruction is a capture instruction;
  if the target control is a remove control, the first operation instruction is a delete instruction;
  if the target control is a save control, the first operation instruction is a save instruction; and
  if the target control is a calibration control, the first operation instruction is a calibration instruction.

The capture instruction is used by the computer device to control the target camera to capture an image, the delete instruction is used by the computer device to delete an image to be deleted, the save instruction is used by the computer device to save the captured image, and the calibration instruction is used by the computer device to calibrate the target camera.

In this embodiment of the present application, after the target camera captures an image, the captured image may be displayed in an image display region 306 in FIG. 3, and information about the image may be displayed in an image information display region 307 in FIG. 3 at the same time. The information about the image includes, for example, an identifier of the image and quality information of the image. The user may determine whether to delete the image based on the quality information of the image. If an image needs to be deleted, the user can click on the remove control. Correspondingly, the computer device obtains a corresponding delete instruction to delete the image selected by the user.

According to the method provided in this embodiment of the present application, based on the same camera calibration interface, the user can implement a plurality of operations, such as an operation of capturing an image, an operation of deleting an image, an operation of saving an image, and a calibrating operation, without the need of switching between the camera client and the third-party calibration tool, so that the complexity of the operation is reduced, and the whole process is easy to operate.

In some of the embodiments, a corresponding operation in a camera calibration process being executed based on the first operation instruction and the target configuration information in S203 may include any one of the following:
  controlling, based on the capture instruction and first target configuration information corresponding to the capture instruction, a target camera to capture an image, where the first target configuration information includes a parameter of the target camera;
  deleting an image to be deleted based on the delete instruction and second target configuration information corresponding to the delete instruction, where the second target configuration information includes information about the image to be deleted;
  saving an image to be saved based on the save instruction and third target configuration information corresponding to the save instruction, where the third target configuration information includes information about and a save path of the image to be saved; and
  calibrating the target camera based on the calibration instruction and fourth target configuration information corresponding to the calibration instruction, to obtain and save a calibrated parameter of the target camera, where the fourth target configuration information includes a target calibration algorithm.

In this embodiment of the present application, in the single-camera calibration process, the first target configuration information corresponding to the capture instruction may include the selected target camera, the parameter of the target camera, and the like. For example, the parameter of the target camera may include a width of a single pixel, a height of a single pixel, a focal length, an average filter length and width, and other information that are of the target camera. The second target configuration information corresponding to the delete instruction may include the information about the image to be deleted, and the information about the image to be deleted may include a preset temporary image storage space. The third target configuration information corresponding to the save instruction may include a preset save path. The fourth target configuration information corresponding to the calibration instruction may include the target calibration algorithm, the selected target camera, a description file name of a calibration target, an image file name of a calibration target (PostScript file name), a file save path, an intrinsic parameter file name, an extrinsic parameter file name, a map file name, a calibration target thickness, a single-pixel width, a single-pixel height, a focal length, an average filter length and width, a calibration target feature angle direction, and other information.

If the first operation instruction is a capture instruction, image capturing is started based on the first target configuration information, and the image is saved in the preset temporary image storage space. If the first operation instruction is a delete instruction, the image to be deleted may be determined based on the temporary image storage space in the second target configuration information, the image to be deleted is found from the temporary image storage space, and then the image to be deleted in the temporary image storage space is deleted. If the first operation instruction is a save instruction, remaining images in the temporary image storage space may be saved in the preset save path, or a captured image selected by the user may be saved in the save path.

In this embodiment of the present application, if it is single-camera calibration, the calibrated parameter of the target camera may include an intrinsic parameter, an extrinsic parameter, and a map parameter of the target camera.

In some of the embodiments, after the target camera is calibrated based on the calibration instruction and the fourth target configuration information corresponding to the calibration instruction, a calibration log record may be further automatically generated to facilitate subsequent tracing of the calibration process.

It should be noted that in a conventional technology, after a calibration result is obtained, a calibrated parameter of the target camera in the calibration result needs to be manually saved in a specified path, and there is problem that an error in copying a file leads to inaccurate detection accuracy. However, in this embodiment of the present application, after the target camera is calibrated to obtain the calibrated parameter of the target camera, a generated intrinsic parameter file, extrinsic parameter file, and map file can be automatically saved in a file save path set in the fourth target configuration information based on the file save path. Therefore, there is no need to manually save the calibrated parameter in a specified path. This further reduces the complexity of the manual operation of the camera calibration process, and avoids the problem of copying errors that may result from manually copying the calibrated parameter to the specified path.

In some of the embodiments, the camera calibration interface includes a selection region. As shown in FIG. 3, the single-camera calibration interface in FIG. 3 includes a selection region 301, the selection region 301 includes a camera selection setting bar 302, and a target camera may be selected through the camera selection setting bar 302. For a process of selecting a target camera, reference may be made to FIG. 6. FIG. 6 is a schematic flowchart of a target camera determining method according to an embodiment of the present application. The method includes the following steps:

In S601, a second operation instruction is obtained based on the selection region, where the second operation instruction includes a camera identifier.

The user may select a camera from a drop-down menu in the camera selection setting bar 302. Correspondingly, the computer device obtains a corresponding second operation instruction based on an operation of the user selecting the camera from the drop-down menu, and the second operation instruction includes an identifier of the camera selected by the user. The identifier of the camera selected by the user may include one camera identifier or two camera identifiers.

In S602, a target camera corresponding to the camera identifier is determined according to the second operation instruction.

As shown in FIG. 3, the identifier of the camera selected by the user is camera 1, and camera 1 is the target camera.

According to the method provided in this embodiment of the present application, the second operation instruction including the camera identifier is obtained based on the selection region, and the target camera corresponding to the camera identifier is determined according to the second operation instruction, so that it is convenient for the user to select the target camera to be calibrated. It should be noted that, after the user selects the target camera, the user may click on a camera connection control in FIG. 3, so as to establish a communication connection to the target camera.

In some of the embodiments, as shown in FIG. 3, the selection region 301 may further include a calibration algorithm selection setting bar 303, and a target calibration algorithm may be selected through the calibration algorithm selection setting bar 303. For a process of selecting a target calibration algorithm, reference may be made to FIG. 7. FIG. 7 is a schematic flowchart of a target calibration algorithm determining method according to an embodiment of the present application. The method includes the following steps:

In S701, a third operation instruction is obtained based on the selection region, where the third operation instruction includes a calibration algorithm identifier.

The user may select a calibration algorithm from the calibration algorithm selection setting bar 303, for example, the user clicks on a small circle in the calibration algorithm selection setting bar 303, and the small circle is a radio control. Then, the computer device may obtain a calibration algorithm corresponding to the small circle based on a third operation instruction corresponding to the user selecting the small circle in the selection region 301, and use the calibration algorithm as the target calibration algorithm.

In S702, a target calibration algorithm corresponding to the calibration algorithm identifier is determined according to the third operation instruction.

According to the method provided in this embodiment of the present application, the third operation instruction including the calibration algorithm identifier is obtained based on the selection region, and the target calibration algorithm corresponding to the calibration algorithm identifier is determined according to the third operation instruction, so that it is convenient for the user to select a calibration algorithm actually needed, and an implementation that flexibly adjusts the calibration algorithm and has stronger scenario applicability is provided.

In some of the embodiments, as shown in FIG. 3, the camera calibration interface further includes a setting control 304. The user may perform a trigger operation on the setting control 304, for example, the user may click on the setting control 304 to perform a trigger operation on the setting control 304, and correspondingly, the computer device may display a setting interface in response to the trigger operation. Displaying of the setting interface includes the following manners:

displaying a setting interface in response to a second trigger operation on the setting control; and obtaining the configuration information based on the setting interface.

In this embodiment of the present application, setting interfaces may be displayed through the setting control 304. The setting interfaces are shown in FIG. 4 and FIG. 5 illustrated in the foregoing embodiment. Configuration information may be set through the setting interfaces in FIG. 4 and FIG. 5.

It should be noted that if the camera calibration process is used to calibrate a single camera, as shown in FIG. 3, the setting interface includes at least one of a description file name setting bar, a calibration target image file name (PostScript file name) setting bar, a file save path setting bar, an intrinsic parameter file name setting bar, an extrinsic parameter file name setting bar, a map file name setting bar, a thickness setting bar, a single-pixel width setting bar, a single-pixel height setting bar, a focal length setting bar, an average filter length and width setting bar, and a calibration target feature angle direction setting bar. Each setting bar is used to set a corresponding parameter, for example, the description file name setting bar is used to set a description file name of the calibration target, and the PostScript file name setting bar is used to set a PostScript file name.

Schematic diagrams of interfaces shown in FIG. 4 and FIG. 5 are both components of the setting interfaces. If the description file name of the calibration target is not set in the configuration information, the description file of the calibration target can be generated through the interface shown in FIG. 5. After the user sets related information through the setting interface shown in FIG. 5, and clicks on a file generation control below, the computer device obtains a click operation on the file generation control to generate the description file of the calibration target.

In some of the embodiments, the camera calibration interface further includes an image display region 306, and the image display region 306 is used to display an image captured by the camera or a calibration result image.

Figures 8, 9:
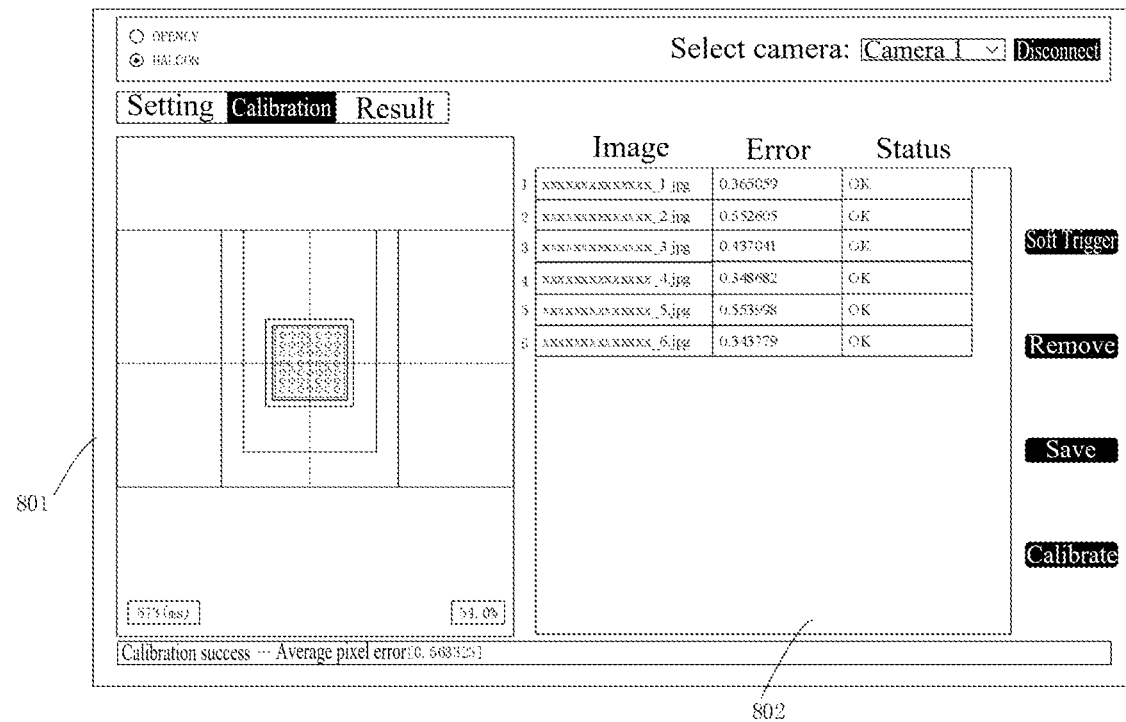
FIG. 8 is a schematic diagram 2 of a single-camera calibration interface according to an embodiment of the present application.
FIG. 9 is a schematic diagram of a result interface according to an embodiment of the present application.

For example, refer to FIG. 8. FIG. 8 is a schematic diagram 2 of a single-camera calibration interface according to an embodiment of the present application. The single-camera calibration interface in FIG. 8 further includes an image display region 801, and the image display region 801 is used to display an image captured by the target camera and/or a calibration result image.

It should be noted that after the target camera is controlled to capture an image based on the capture instruction and the first target configuration information corresponding to the capture instruction, the image captured by the target camera or the calibration result image may be further displayed on the camera calibration interface. The calibration result image is displayed in the image display region 801 in FIG. 8.

In some of the embodiments, the camera calibration interface further includes image information display region, and the image information display region is used to display at least one of a logo, a pixel error, and a status of an image captured by the camera.

For example, as shown in FIG. 8, the camera calibration interface further includes an image information display region 802, and the image information display region 802 is used to display at least one of a logo, a pixel error, and a status of an image captured by the target camera.

It should be noted that after the target camera is controlled to capture an image based on the capture instruction and the first target configuration information corresponding to the capture instruction, quality information of the image captured by the target camera may be further displayed on the camera calibration interface. The quality information of the image captured by the target camera is displayed in the image information display region 802. The quality information of the image includes, for example, a pixel error of the image and the status of the image. The status of the image is used to indicate whether quality of the image meets a preset quality condition. For example, when a status of an image is OK, it indicates that the quality of the image meets the preset quality condition; and when the status of the image is NO, it indicates that the quality of the image does not meet the preset quality condition.

The pixel error of the image may be determined based on a difference between a specification of the image captured by the target camera and a standard specification of the calibration target set in the configuration information. For example, if the pixel error is less than a preset error threshold, it may be determined that the status of the image is OK; and if the pixel error is not less than the preset error threshold, it may be determined that the status of the image is NO. The computer device may also determine, based on quality information of an image, an image not meeting the preset quality condition, delete the image not meeting the preset quality condition, and display only an image meeting the preset quality condition in the image information display region 802. Further, after deleting the image not meeting the preset quality condition, the computer device can perform camera calibration based on an image meeting the preset quality condition, so that the quality of images participating in the camera calibration is high, thereby improving the accuracy of camera calibration results.

In this embodiment, the user may select an image to be saved for saving based on image information displayed in the image information display region 802. For example, if the user needs to save an image with serial number 1, the user selects the row of cells where the image with serial number 1 is located, and click on the save control to save the image with serial number 1. To delete an image, the user can select the row of cells where the image is located and click on the remove control to delete the image.

In this embodiment of the present application, the calibration process may alternatively be manually triggered. For example, if a single-camera calibration process is to be performed, the user can click on the calibration control shown in FIG. 8 to perform corresponding single-camera calibration. As shown in FIG. 8, in the image information display region 802, information about six images in total is displayed. After the user clicks on the calibration control, the target camera can be calibrated based on the information about the six images to obtain an intrinsic parameter file, an extrinsic parameter file, and a map file of the target camera. After the target camera is calibrated, a calibration success or a calibration failure may be displayed in the calibration status display box. For example, FIG. 8 shows a calibration success. An average pixel error of a calibration result image obtained after the calibration may be further displayed in the calibration status display box at the same time. For example, the average pixel error shown in FIG. 8 is 0.563323.

In some of the embodiments, the camera calibration interface may further include a calibration result control. The calibration result control is, for example, the calibration result control 305 shown in FIG. 3, and the calibration result interface may be displayed based on the calibration result control 305.

FIG. 9 is a schematic diagram of a result interface according to an embodiment of the present application. For example, after the user performs a click operation on the calibration result control 305, the computer device may display the calibration result interface shown in FIG. 9 in response to the second trigger operation on the calibration result control 305. The calibration result interface is used to display a calibrated parameter of the target camera. Only intrinsic camera parameters and extrinsic camera parameters are shown in FIG. 9.

In this embodiment, the user can view calculation results of the intrinsic parameters and extrinsic parameters of the target camera through the displayed result interface.

The foregoing embodiments describe the single-camera calibration. The embodiment of the present application further provides a dual-camera calibration method. A dual-camera calibration process will be described below with reference to FIG. 10 to FIG. 12.

Figure 10:
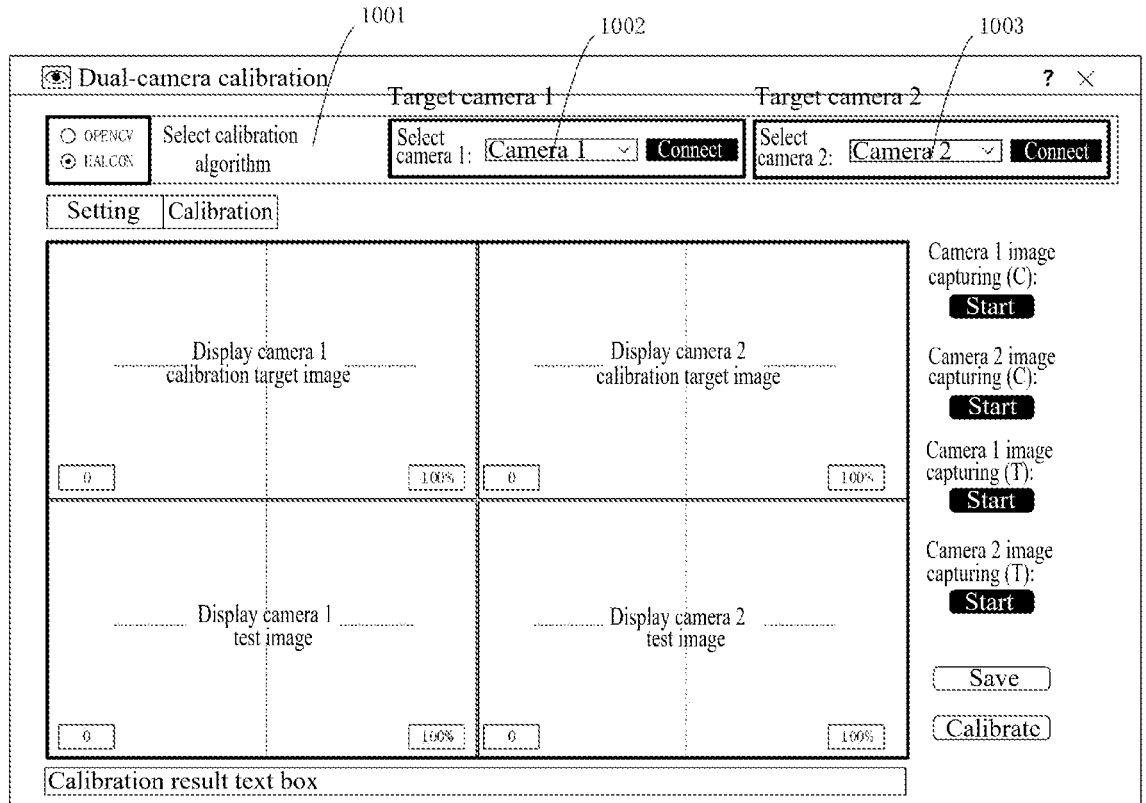
FIG. 10 is a schematic diagram 1 of a dual-camera calibration interface according to an embodiment of the present application.

FIG. 10 is a schematic diagram 1 of a dual-camera calibration interface according to an embodiment of the present application. The calibration control in the main interface menu of the software is selected to proceed to the dual-camera calibration control, and then the dual-camera calibration interface shown in FIG. 10 is displayed. The dual-camera calibration interface includes a selection region 1001. The selection region 1001 is similar to the selection region 301 on the single-camera calibration interface shown in FIG. 3, except that the selection region 1001 includes two camera selection setting bars. Target camera 1 and target camera 2 can be selected through the two camera selection setting bars. For example, a setting bar 1002 on the right side of "Select camera 1" in FIG. 10 is used to select target camera 1, and a setting bar 1003 on the right side of "Select camera 2" in FIG. is used to select target camera 2. As shown in FIG. 10, camera 1 is selected as target camera 1, and camera 2 is selected as target camera 2.

After selecting the target camera, the user can separately click on a connection camera control on the right side of the setting bar 1002 to establish a connection to target camera 1 and click a connection camera control on the right side of the setting bar 1003 to establish a connection to target camera 2.

It should be noted that in the dual-camera calibration process, the user can set, through the setting interface, a description file name, an intrinsic parameter file name of camera 1, an intrinsic parameter file name of camera 2, a map file name of camera 1, a map file name of camera 2, a calibration target height, a test height, a calibration target center distance, an initial resolution, an edge removal percentage, an overlapping percentage, an average filter length and width, a feature angle direction, and other information.

Figure 11:
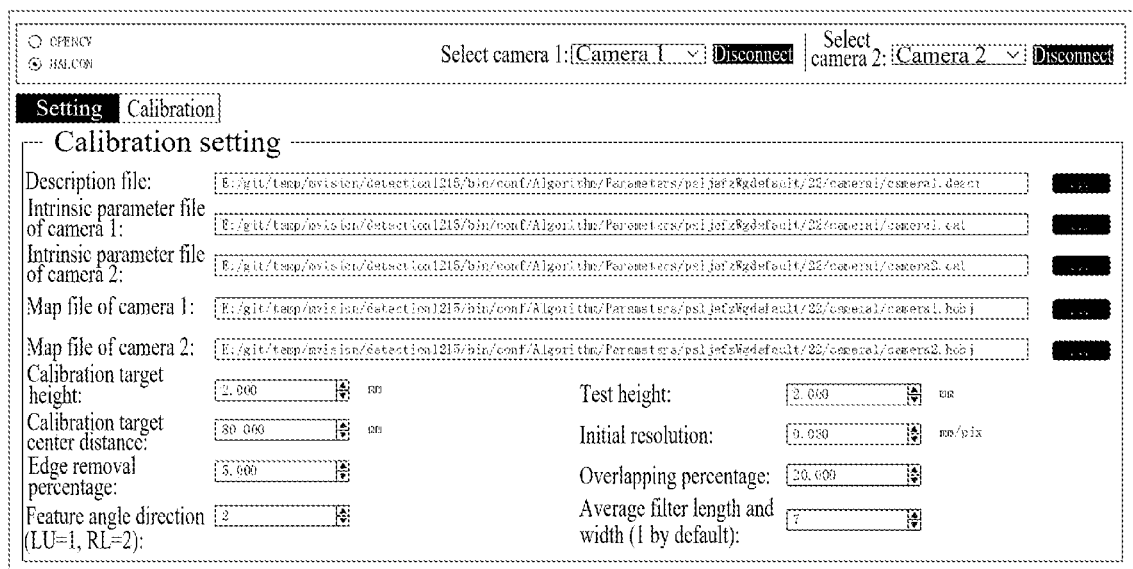
FIG. 11 is a schematic diagram of a setting interface of dual-camera calibration according to an embodiment of the present application.

FIG. 11 is a schematic diagram of a setting interface of dual-camera calibration according to an embodiment of the present application. The dual-camera setting interface includes at least one of a description file name setting bar, an intrinsic parameter file name setting bar of a first camera, an intrinsic parameter file name setting bar of a second camera, a map file name setting bar of the first camera, a map file name setting bar of the second camera, a calibration target height setting bar, a target object height setting bar, a calibration target center distance setting bar, an initial resolution setting bar, an edge removal percentage setting bar, an overlapping percentage setting bar, an average filter length and width setting bar, and a calibration target feature angle direction setting bar. The intrinsic parameter file name setting bar of the first camera is used to set an intrinsic parameter file name of camera 1, the intrinsic parameter file name setting bar of the second camera is used to set an intrinsic parameter file name of camera 2, the map file name setting bar of the first camera is used to set a map file name of camera 1, the map file name of the second camera is used to set a map file name of camera 2, and the target object height setting bar is used to set a test height of a target object.

It should be noted that in the dual-camera calibration process, there is necessarily a description file. If there is no description file, a description file needs to be generated. The intrinsic parameter file of camera 1, the intrinsic parameter file of camera 2, the map file of camera 1, and the map file of camera 2 are files generated after calibration of a single camera. To be specific, camera 1 is used as the target camera, and single-camera calibration is performed on camera 1 by using the single-camera calibration method provided in the foregoing embodiments, so that the intrinsic parameter file of camera 1 and the map file of camera 1 can be generated; camera 2 is used as the target camera, and single-camera calibration is performed on camera 2 by using the single-camera calibration method provided in the foregoing embodiments, so that the intrinsic parameter file of camera 2 and the map file of camera 2 can be generated.

Image capturing can be started after camera 1, camera 2, and the target calibration algorithm are selected by using the dual-camera calibration interface shown in FIG. 10, and related information is set by using the dual-camera setting interface shown in FIG. 11. For example, the user clicks on a camera 1 image capturing (C) control to trigger camera 1 to capture an image. The captured image is displayed in the upper left region, and the image is an image of a calibration target corresponding to camera 1. The user clicks on a camera 2 image capturing (C) control to trigger camera 2 to capture an image. The captured image is displayed in the upper right region, and the image is an image of a calibration target corresponding to camera 2. The user clicks on a camera 1 image capturing (T) control to trigger camera 1 to capture an image. The captured image is displayed in the lower left region, and the image is a test image captured by camera 1. The user clicks on a camera 2 image capturing (T) control to trigger camera 2 to capture an image. The captured image is displayed in the lower right region, and the image is a test image captured by camera 2. The image of the calibration target means that the captured image includes the target object and the calibration target, and the test image means that the captured image includes only the target object, such as a battery.

In the dual-camera calibration process, after image capturing, the user may trigger the calibration control in the functional region shown in FIG. 10. Correspondingly, the computer device performs calibration in response to the trigger operation on the calibration control based on information set in the setting interface shown in FIG. 11 and captured four images, to obtain dual-camera calibration results of camera 1 and camera 2 and one calibration result image, and may display the images captured by camera 1 and camera 2 and/or the calibration result image in the image display region of the dual-camera calibration interface.

Figure 12:
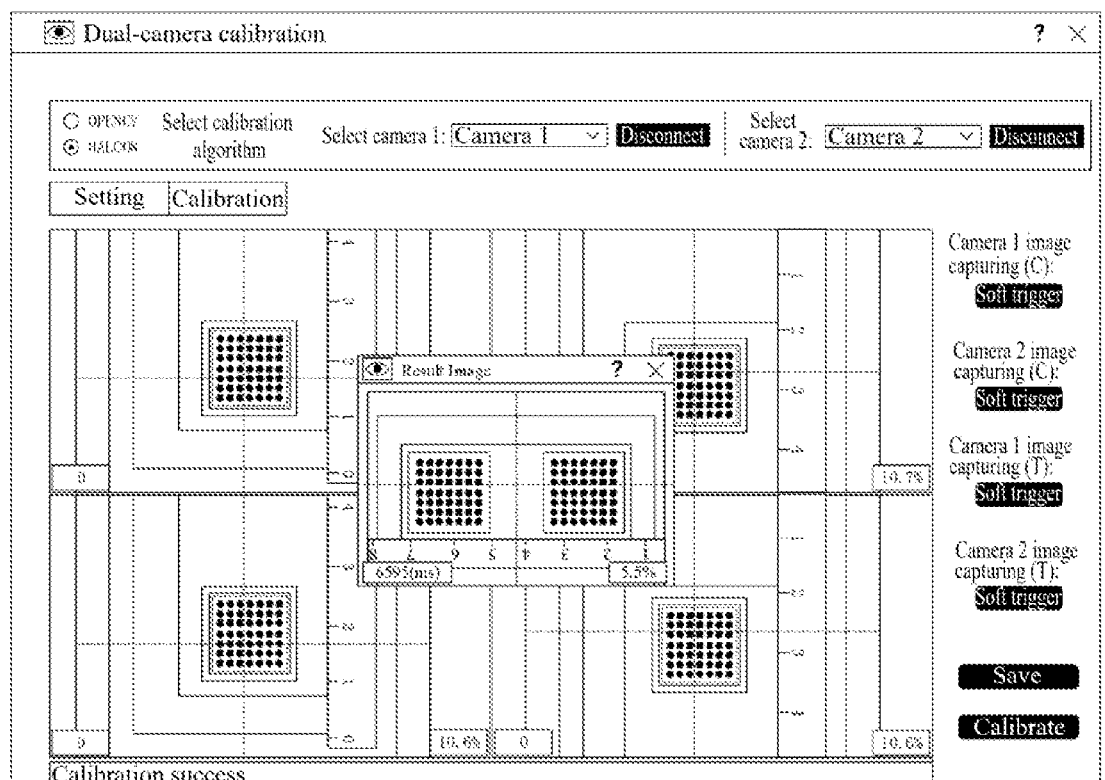
FIG. 12 is a schematic diagram 2 of a dual-camera calibration interface according to an embodiment of the present application.

The images captured by camera 1 and camera 2 and the calibration result image that are displayed in the image display region can be shown in FIG. 12. FIG. 12 is a schematic diagram 2 of a dual-camera calibration interface according to an embodiment of the present application. FIG. 12 shows four images captured by camera 1 and camera 2 and one calibration result image. In addition, a calibration success or a calibration failure may be further displayed in the calibration status display box. As shown in FIG. 12, a calibration success is displayed in the calibration status display box.

Figure 13:
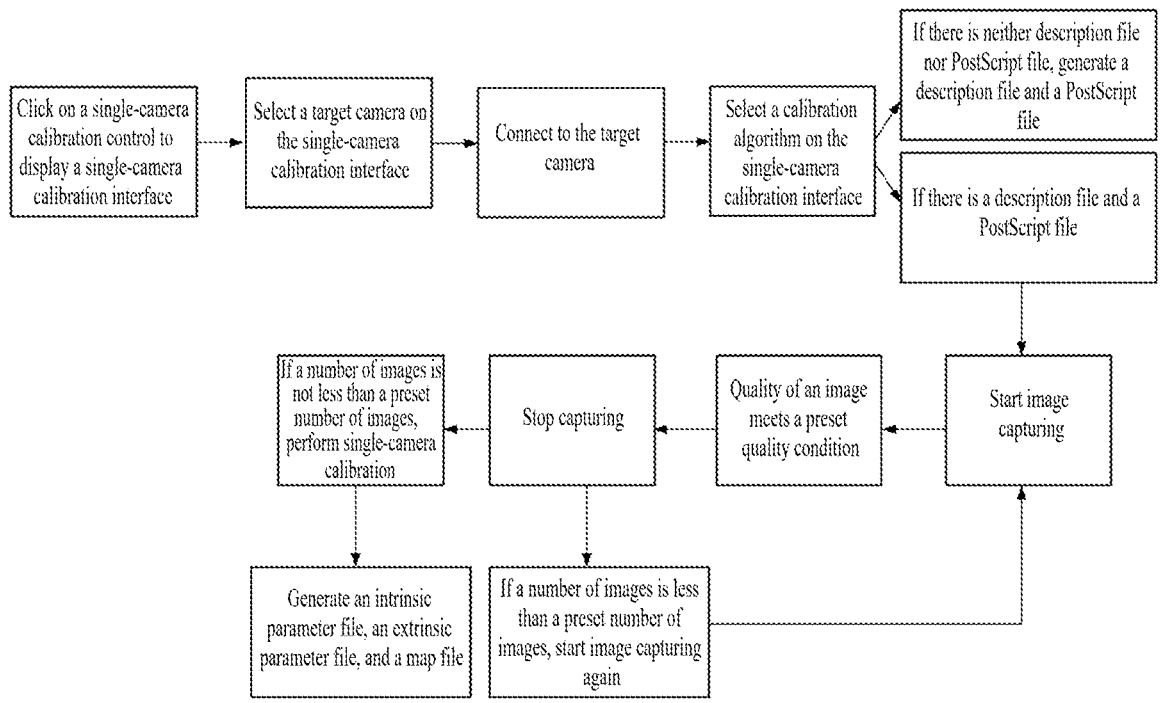
FIG. 13 is a schematic diagram of a single-camera calibration process according to an embodiment of the present application.

In the foregoing embodiments, the process of single-camera calibration and dual-camera calibration is described based on the schematic diagram of the interface. Here, the single-camera calibration process is described with reference to FIG. 13. FIG. 13 is a schematic diagram of a single-camera calibration process according to an embodiment of the present application. The process includes the following steps:
1. clicking a single-camera calibration control to display a single-camera calibration interface;
2. selecting a target camera on the single-camera calibration interface;
3. Connecting to the target camera;
4. selecting a calibration algorithm on the single-camera calibration interface;
5. if there is neither description file nor PostScript file, generating a description file and a PostScript file;
6. if there is a description file and a PostScript file, starting image capturing;
7. quality of an image meeting a preset quality condition;
8. stopping capturing;
9. if a number of images is less than a preset number of images, starting image capturing again;
10. if the number of images is not less than the preset number of images, performing single-camera calibration; and
11. Generating an intrinsic parameter file, an extrinsic parameter file, and a map file.

The foregoing process can be performed in conjunction with the schematic diagram of the interface provided in the embodiment of the present application, and the schematic diagram related to the single-camera calibration interface will not be repeated here.

Figure 14:
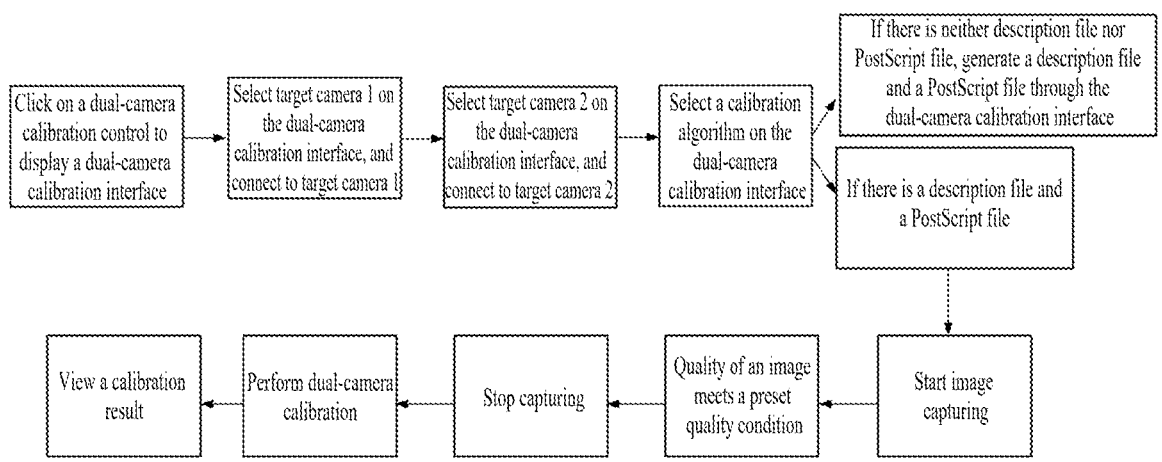
FIG. 14 is a schematic diagram of a dual-camera calibration process according to an embodiment of the present application.

FIG. 14 is a schematic diagram of a dual-camera calibration process according to an embodiment of the present application. The process includes the following steps:
1. clicking a dual-camera calibration control to display a dual-camera calibration interface;
2. selecting target camera 1 on a dual-camera calibration interface, and connecting to target camera 1;
3. selecting target camera 2 on the dual-camera calibration interface, and connecting to target camera 2;
4. selecting a calibration algorithm on the dual-camera calibration interface;
5. if there is neither description file nor PostScript file, generating a description file and a PostScript file through the dual-camera calibration interface;
6. if there is a description file and a PostScript file, starting image capturing;
7. quality of an image meeting a preset quality condition;
8. stopping capturing;
9. performing dual-camera calibration; and
10. viewing a calibration result.

It should be understood that although the steps in the flowcharts in the foregoing embodiments are shown sequentially according to the arrows, these steps are not necessarily executed sequentially in the order indicated by the arrows. Unless otherwise specified herein, there is no strict order limitation on the execution of these steps, and these steps can be executed in other orders. In addition, at least some of the steps in the flowcharts in the foregoing embodiments may include a plurality of steps or phases, and these steps or phases are not necessarily executed at the same time, but may be executed at different moments. These steps or phases are not necessarily executed sequentially, but may be executed in turn or alternately with other steps or at least part of steps in other steps or phases.

Based on the same inventive concept, an embodiment of the present application further provides a camera calibration apparatus for implementing the above-mentioned camera calibration method. The solution provided by the apparatus to the problem is similar to the implementation solution described in the foregoing method, and therefore, for the specific limitations in one or more camera calibration apparatus embodiments provided below, reference may be made to the definition of the camera calibration method above. Details are not described herein again.

Figure 15:
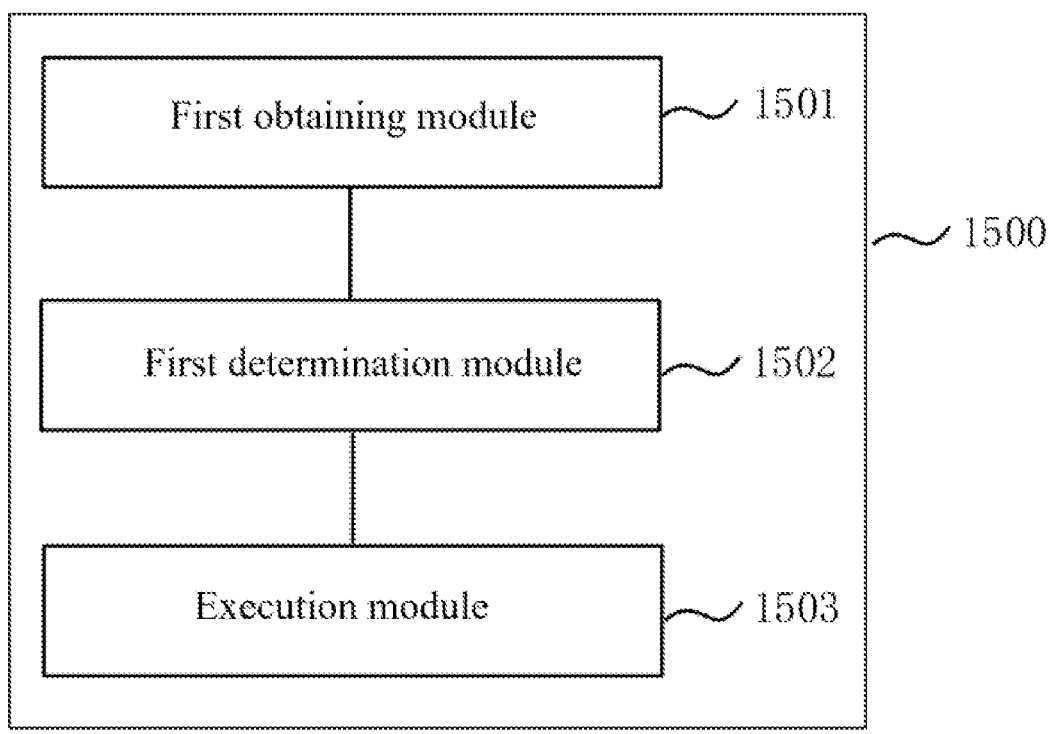
FIG. 15 is a schematic diagram of a structure of a camera calibration apparatus according to an embodiment of the present application.

In an embodiment, as shown in FIG. 15, FIG. 15 is a schematic diagram of a structure of a camera calibration apparatus according to an embodiment of the present application. The apparatus 1500 includes:
a first obtaining module 1501 configured to obtain a first operation instruction based on a camera calibration interface;
a first determination module 1502 configured to determine target configuration information matching the first operation instruction from configuration information, where the configuration information is set based on the camera calibration interface; and
an execution module 1503 configured to execute a corresponding operation in a camera calibration process based on the first operation instruction and the target configuration information.

In one of the embodiments, the camera calibration interface includes a functional region, and the functional region includes a plurality of trigger controls with different functions; and the obtaining a first operation instruction based on a camera calibration interface includes:
obtaining the first operation instruction in response to a first trigger operation on a target control in the functional region, where the target control is any one of the plurality of trigger controls with different functions.

In one of the embodiments, if the target control is a capture control, the first operation instruction is a capture instruction;
if the target control is a remove control, the first operation instruction is a delete instruction;
if the target control is a save control, the first operation instruction is a save instruction; and
if the target control is a calibration control, the first operation instruction is a calibration instruction.

In one of the embodiments, the execution module 1503 is configured to control, based on the capture instruction and first target configuration information corresponding to the capture instruction, a target camera to capture an image, where the first target configuration information includes a parameter of the target camera; delete an image to be deleted based on the delete instruction and second target configuration information corresponding to the delete instruction, where the second target configuration information includes information about the image to be deleted; save an image to be saved based on the save instruction and third target configuration information corresponding to the save instruction, where the third target configuration information includes information about and a save path of the image to be saved; and calibrate the target camera based on the calibration instruction and fourth target configuration information corresponding to the calibration instruction, to obtain and save a calibrated parameter of the target camera, where the fourth target configuration information includes a target calibration algorithm.

In one of the embodiments, the camera calibration interface includes a selection region; and the apparatus 1500 further includes:
a second obtaining module configured to obtain a second operation instruction based on the selection region, where the second operation instruction includes a camera identifier; and a second determination module configured to determine a target camera corresponding to the camera identifier according to the second operation instruction.

In one of the embodiments, the apparatus 1500 further includes:
- a third obtaining module configured to obtain a third operation instruction based on the selection region, where the third operation instruction includes a calibration algorithm identifier; and
- a third determination module configured to determine a target calibration algorithm corresponding to the calibration algorithm identifier according to the third operation instruction.

In one of the embodiments, the camera calibration interface further includes a setting control, and the apparatus 1500 further includes:
- a first display module configured to display a setting interface in response to a second trigger operation on the setting control; and obtain the configuration information based on the setting interface.

In one of the embodiments, if the camera calibration process is used to calibrate a single camera, the setting interface includes at least one of a description file name setting bar, a calibration target image file name setting bar, a file save path setting bar, an intrinsic parameter file name setting bar, an extrinsic parameter file name setting bar, a map file name setting bar, a thickness setting bar, a single-pixel width setting bar, a single-pixel height setting bar, a focal length setting bar, an average filter length and width setting bar, and a calibration target feature angle direction setting bar.

In one of the embodiments, if the camera calibration process is used to calibrate dual cameras, the setting interface includes at least one of a description file name setting bar, an intrinsic parameter file name setting bar of a first camera, an intrinsic parameter file name setting bar of a second camera, a map file name setting bar of the first camera, a map file name setting bar of the second camera, a calibration target height setting bar, a target object height setting bar, a calibration target center distance setting bar, an initial resolution setting bar, an edge removal percentage setting bar, an overlapping percentage setting bar, an average filter length and width setting bar, and a calibration target feature angle direction setting bar.

In one of the embodiments, the camera calibration interface further includes an image display region, and the image display region is used to display an image captured by the target camera and/or a calibration result image.

In one of the embodiments, the camera calibration interface further includes an image information display region, and the image information display region is used to display at least one of a logo, a pixel error, and a status of an image captured by the target camera.

In one of the embodiments, the camera calibration interface further includes a calibration result control; and the apparatus 1500 further includes:
- a second display module configured to display a calibration result interface in response to a second trigger operation on the result control, where the calibration result interface is used to display the calibrated parameter of the target camera.

All or some of the modules in the foregoing camera calibration apparatus may be implemented by using software, hardware, or a combination thereof. The foregoing modules can be built in or independent of a processor in the computer device in a form of hardware, or may be stored in a memory of the computer device in a form of software, so that the processor invokes and executes corresponding operations of the foregoing modules.

In an embodiment, a computer device is provided, including a memory and a processor, a computer program is stored in the memory, and the processor executes the computer program to implement the steps of:
- obtaining a first operation instruction based on a camera calibration interface;
- determining target configuration information matching the first operation instruction from configuration information, where the configuration information is set based on the camera calibration interface; and
- executing a corresponding operation in a camera calibration process based on the first operation instruction and the target configuration information.

In an embodiment, the camera calibration interface includes a functional region, and the functional region includes a plurality of trigger controls with different functions; and the processor executes the computer program to further implement the step of:
- obtaining the first operation instruction in response to a first trigger operation on a target control in the functional region, where the target control is any one of the plurality of trigger controls with different functions.

In an embodiment, the method further includes any one of the following:
- if the target control is a capture control, the first operation instruction is a capture instruction;
- if the target control is a remove control, the first operation instruction is a delete instruction;
- if the target control is a save control, the first operation instruction is a save instruction; and
- if the target control is a calibration control, the first operation instruction is a calibration instruction.

In an embodiment, the processor executes the computer program to further implement the steps of:
- controlling, based on the capture instruction and first target configuration information corresponding to the capture instruction, a target camera to capture an image, where the first target configuration information includes a parameter of the target camera;
- deleting an image to be deleted based on the delete instruction and second target configuration information corresponding to the delete instruction, where the second target configuration information includes information about the image to be deleted;
- saving an image to be saved based on the save instruction and third target configuration information corresponding to the save instruction, where the third target configuration information includes information about and a save path of the image to be saved; and
- calibrating the target camera based on the calibration instruction and fourth target configuration information corresponding to the calibration instruction, to obtain and save a calibrated parameter of the target camera, where the fourth target configuration information includes a target calibration algorithm.

In an embodiment, the camera calibration interface includes a selection region; and the processor executes the computer program to further implement the steps of:
- obtaining a second operation instruction based on the selection region, where the second operation instruction includes a camera identifier; and
- determining a target camera corresponding to the camera identifier according to the second operation instruction.

In an embodiment, the processor executes the computer program to further implement the steps of:

obtaining a third operation instruction based on the selection region, where the third operation instruction includes a calibration algorithm identifier; and determining a target calibration algorithm corresponding to the calibration algorithm identifier according to the third operation instruction.

In an embodiment, the processor executes the computer program to further implement the steps of:

displaying a setting interface in response to a second trigger operation on the setting control; and obtaining the configuration information based on the setting interface.

In an embodiment, if the camera calibration process is used to calibrate a single camera, the setting interface includes at least one of a description file name setting bar, a calibration target image file name setting bar, a file save path setting bar, an intrinsic parameter file name setting bar, an extrinsic parameter file name setting bar, a map file name setting bar, a thickness setting bar, a single-pixel width setting bar, a single-pixel height setting bar, a focal length setting bar, an average filter length and width setting bar, and a calibration target feature angle direction setting bar.

In an embodiment, if the camera calibration process is used to calibrate dual cameras, the setting interface includes at least one of a description file name setting bar, an intrinsic parameter file name setting bar of a first camera, an intrinsic parameter file name setting bar of a second camera, a map file name setting bar of the first camera, a map file name setting bar of the second camera, a calibration target height setting bar, a target object height setting bar, a calibration target center distance setting bar, an initial resolution setting bar, an edge removal percentage setting bar, an overlapping percentage setting bar, an average filter length and width setting bar, and a calibration target feature angle direction setting bar.

In an embodiment, the camera calibration interface further includes an image display region, and the image display region is used to display an image captured by the target camera and/or a calibration result image.

In an embodiment, the camera calibration interface further includes an image information display region, and the image information display region is used to display at least one of a logo, a pixel error, and a status of an image captured by the target camera.

In an embodiment, the camera calibration interface further includes a calibration result control; and the processor executes the computer program to further implement the step of:

displaying a calibration result interface in response to a second trigger operation on the result control, where the calibration result interface is used to display the calibrated parameter of the target camera.

An embodiment provides a computer-readable storage medium having stored thereon a computer program that, when executed by a processor, implements the steps of:

obtaining a first operation instruction based on a camera calibration interface;

determining target configuration information matching the first operation instruction from configuration information, where the configuration information is set based on the camera calibration interface; and executing a corresponding operation in a camera calibration process based on the first operation instruction and the target configuration information.

In an embodiment, the camera calibration interface includes a functional region, and the functional region includes a plurality of trigger controls with different functions; and the computer program, when executed by a processor, further implements the step of:

obtaining the first operation instruction in response to a first trigger operation on a target control in the functional region, where the target control is any one of the plurality of trigger controls with different functions.

In an embodiment, the method further includes any one of the following:

if the target control is a capture control, the first operation instruction is a capture instruction;

if the target control is a remove control, the first operation instruction is a delete instruction;

if the target control is a save control, the first operation instruction is a save instruction; and if the target control is a calibration control, the first operation instruction is a calibration instruction.

In an embodiment, the computer program, when executed by a processor, further implements the steps of:

controlling, based on the capture instruction and first target configuration information corresponding to the capture instruction, a target camera to capture an image, where the first target configuration information includes a parameter of the target camera;

deleting an image to be deleted based on the delete instruction and second target configuration information corresponding to the delete instruction, where the second target configuration information includes information about the image to be deleted;

saving an image to be saved based on the save instruction and third target configuration information corresponding to the save instruction, where the third target configuration information includes information about and a save path of the image to be saved; and calibrating the target camera based on the calibration instruction and fourth target configuration information corresponding to the calibration instruction, to obtain and save a calibrated parameter of the target camera, where the fourth target configuration information includes a target calibration algorithm.

In an embodiment, the camera calibration interface includes a selection region; and the computer program, when executed by a processor, further implements the steps of:

obtaining a second operation instruction based on the selection region, where the second operation instruction includes a camera identifier; and determining a target camera corresponding to the camera identifier according to the second operation instruction.

In an embodiment, the computer program, when executed by a processor, further implements the steps of:

obtaining a third operation instruction based on the selection region, where the third operation instruction includes a calibration algorithm identifier; and determining a target calibration algorithm corresponding to the calibration algorithm identifier according to the third operation instruction.

In an embodiment, the computer program, when executed by a processor, further implements the steps of:

displaying a setting interface in response to a second trigger operation on the setting control; and obtaining the configuration information based on the setting interface.

In an embodiment, if the camera calibration process is used to calibrate a single camera, the setting interface includes at least one of a description file name setting bar, a calibration target image file name setting bar, a file save path setting bar, an intrinsic parameter file name setting bar, an extrinsic parameter file name setting bar, a map file name setting bar, a thickness setting bar, a single-pixel width setting bar, a single-pixel height setting bar, a focal length setting bar, an average filter length and width setting bar, and a calibration target feature angle direction setting bar.

In an embodiment, if the camera calibration process is used to calibrate dual cameras, the setting interface includes at least one of a description file name setting bar, an intrinsic parameter file name setting bar of a first camera, an intrinsic parameter file name setting bar of a second camera, a map file name setting bar of the first camera, a map file name setting bar of the second camera, a calibration target height setting bar, a target object height setting bar, a calibration target center distance setting bar, an initial resolution setting bar, an edge removal percentage setting bar, an overlapping percentage setting bar, an average filter length and width setting bar, and a calibration target feature angle direction setting bar.

In an embodiment, the camera calibration interface further includes an image display region, and the image display region is used to display an image captured by the target camera and/or a calibration result image.

In an embodiment, the camera calibration interface further includes an image information display region, and the image information display region is used to display at least one of a logo, a pixel error, and a status of an image captured by the target camera.

In an embodiment, the camera calibration interface further includes a calibration result control; and the computer program, when executed by a processor, further implements the step of:
displaying a calibration result interface in response to a second trigger operation on the result control, where the calibration result interface is used to display the calibrated parameter of the target camera.

An embodiment provides a computer program product including a computer program that, when executed by a processor, implements the steps of:
obtaining a first operation instruction based on a camera calibration interface;
determining target configuration information matching the first operation instruction from configuration information, where the configuration information is set based on the camera calibration interface; and
executing a corresponding operation in a camera calibration process based on the first operation instruction and the target configuration information.

In an embodiment, the camera calibration interface includes a functional region, and the functional region includes a plurality of trigger controls with different functions; and the computer program, when executed by a processor, further implements the step of:
obtaining the first operation instruction in response to a first trigger operation on a target control in the functional region, where the target control is any one of the plurality of trigger controls with different functions.

In an embodiment, the method further includes any one of the following:
if the target control is a capture control, the first operation instruction is a capture instruction;
if the target control is a remove control, the first operation instruction is a delete instruction;
if the target control is a save control, the first operation instruction is a save instruction; and
if the target control is a calibration control, the first operation instruction is a calibration instruction.

In an embodiment, the computer program, when executed by a processor, further implements the steps of:
controlling, based on the capture instruction and first target configuration information corresponding to the capture instruction, a target camera to capture an image, where the first target configuration information includes a parameter of the target camera;
deleting an image to be deleted based on the delete instruction and second target configuration information corresponding to the delete instruction, where the second target configuration information includes information about the image to be deleted;
saving an image to be saved based on the save instruction and third target configuration information corresponding to the save instruction, where the third target configuration information includes information about and a save path of the image to be saved; and
calibrating the target camera based on the calibration instruction and fourth target configuration information corresponding to the calibration instruction, to obtain and save a calibrated parameter of the target camera, where the fourth target configuration information includes a target calibration algorithm.

In an embodiment, the camera calibration interface includes a selection region; and the computer program, when executed by a processor, further implements the steps of:
obtaining a second operation instruction based on the selection region, where the second operation instruction includes a camera identifier; and
determining a target camera corresponding to the camera identifier according to the second operation instruction.

In an embodiment, the computer program, when executed by a processor, further implements the steps of:
obtaining a third operation instruction based on the selection region, where the third operation instruction includes a calibration algorithm identifier; and
determining a target calibration algorithm corresponding to the calibration algorithm identifier according to the third operation instruction.

In an embodiment, the computer program, when executed by a processor, further implements the steps of:
displaying a setting interface in response to a second trigger operation on the setting control; and obtaining the configuration information based on the setting interface.

In an embodiment, if the camera calibration process is used to calibrate a single camera, the setting interface includes at least one of a description file name setting bar, a calibration target image file name setting bar, a file save path setting bar, an intrinsic parameter file name setting bar, an extrinsic parameter file name setting bar, a map file name setting bar, a thickness setting bar, a single-pixel width setting bar, a single-pixel height setting bar, a focal length setting bar, an average filter length and width setting bar, and a calibration target feature angle direction setting bar.

In an embodiment, if the camera calibration process is used to calibrate dual cameras, the setting interface includes at least one of a description file name setting bar, an intrinsic parameter file name setting bar of a first camera, an intrinsic parameter file name setting bar of a second camera, a map file name setting bar of the first camera, a map file name setting bar of the second camera, a calibration target height setting bar, a target object height setting bar, a calibration target center distance setting bar, an initial resolution setting bar, an edge removal percentage setting bar, an overlapping percentage setting bar, an average filter length and width setting bar, and a calibration target feature angle direction setting bar.

In an embodiment, the camera calibration interface further includes an image display region, and the image display region is used to display an image captured by the target camera and/or a calibration result image.

In an embodiment, the camera calibration interface further includes an image information display region, and the image information display region is used to display at least one of a logo, a pixel error, and a status of an image captured by the target camera.

In an embodiment, the camera calibration interface further includes a calibration result control; and the computer program, when executed by a processor, further implements the step of:

displaying a calibration result interface in response to a second trigger operation on the result control, where the calibration result interface is used to display the calibrated parameter of the target camera.

It should be noted that user information (including but not limited to user equipment information, user personal information, etc.) and data (including but not limited to data used for analysis, storage, displaying, etc.) in the present application each are information and data authorized by a user or fully authorized by all parties.

Those of ordinary skill in the art can understand that all or some of the processes in the methods of the foregoing embodiments may be implemented by a computer program instructing relevant hardware, and the computer program may be stored in a non-volatile computer-readable storage medium. When the computer program is executed, the processes of the methods in the embodiments may be performed. Any reference to storage, database, or other media used in the embodiments provided in the present application may include at least one of a non-volatile memory and a volatile memory. The non-volatile memory may include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, etc. The volatile memory may include a random access memory (RAM) or an external cache, etc. As an illustration and not a limitation, the RAM can be in various forms, such as a static random access memory (SRAM) or a dynamic random access memory (DRAM). The database in the embodiments provided in the present application may include at least one of a relational database and a non-relational database. The non-relational database may include a blockchain-based distributed database, etc., but is not limited thereto. The processor in the embodiments provided by the present application may be a general-purpose processor, a central processing unit, a graphics processing unit, a digital signal processor, a programmable logic device, a data processing logic device based on quantum computing, etc., and is not limited thereto.

The various technical features of the foregoing embodiments can be combined in any manner, and in order to simplify the description, not all possible combinations of the various technical features of the foregoing embodiments are described. However, as long as there is no conflict between the combinations of these technical features, they should be considered to be within the scope of this specification.

The foregoing embodiments merely describe several implementations of the present application more specifically and in more detail, but cannot be thus understood as a limitation to the patent scope of the present application. It should be pointed out that those of ordinary skill in the art may also make several variations and improvements without departing from the concept of the present application. All these variations and improvements fall within the scope of protection of the present application. Therefore, the scope of protection of the present application shall be subject to the appended claims.

Finally, it should be noted that the foregoing embodiments are merely used for illustrating rather than limiting the technical solutions of the present application. Although the present application has been illustrated in detail with reference to the foregoing embodiments, it should be understood by those of ordinary skill in the art that the technical solutions described in the foregoing embodiments may still be modified, or some or all of the technical features thereof may be equivalently substituted; and such modifications or substitutions do not make the essence of the corresponding technical solution depart from the scope of the technical solutions of the embodiments of the present application, and should fall within the scope of the claims and the description of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. A camera calibration method, wherein the method comprises:

obtaining a first operation instruction based on a camera calibration interface;

determining target configuration information matching the first operation instruction from configuration information, wherein the configuration information is set based on the camera calibration interface; and executing a corresponding operation in a camera calibration process based on the first operation instruction and the target configuration information, wherein the camera calibration process is implemented based on the camera calibration interface without switching between a camera client and a third-party calibration tool, and the corresponding operation is automatically executed without requiring manual saving of a captured image or manual invocation of a calibration tool.

2. The method according to claim 1, wherein the camera calibration interface comprises a functional region, and the functional region comprises a plurality of trigger controls with different functions; and obtaining the first operation instruction based on the camera calibration interface comprises:

obtaining the first operation instruction in response to a first trigger operation on a target control in the functional region, wherein the target control is any one of the plurality of trigger controls with different functions.

3. The method according to claim 2, wherein the method further comprises any one of the following:

when the target control is a capture control, the first operation instruction is a capture instruction;

when the target control is a remove control, the first operation instruction is a delete instruction;

when the target control is a save control, the first operation instruction is a save instruction; and when the target control is a calibration control, the first operation instruction is a calibration instruction.

4. The method according to claim 3, wherein executing the corresponding operation in the camera calibration process based on the first operation instruction and the target configuration information comprises any one of the following:
- controlling, based on the capture instruction and first target configuration information corresponding to the capture instruction, a target camera to capture an image, wherein the first target configuration information comprises a parameter of the target camera;
- deleting an image to be deleted based on the delete instruction and second target configuration information corresponding to the delete instruction, wherein the second target configuration information comprises information about the image to be deleted;
- saving an image to be saved based on the save instruction and third target configuration information corresponding to the save instruction, wherein the third target configuration information comprises information about and a save path of the image to be saved; and
- calibrating the target camera based on the calibration instruction and fourth target configuration information corresponding to the calibration instruction, to obtain and save a calibrated parameter of the target camera, wherein the fourth target configuration information comprises a target calibration algorithm.

5. The method according to claim 1, wherein the camera calibration interface comprises a selection region; and the method further comprises:
- obtaining a second operation instruction based on the selection region, wherein the second operation instruction comprises a camera identifier; and
- determining a target camera corresponding to the camera identifier according to the second operation instruction.

6. The method according to claim 1, wherein the method further comprises:
- obtaining a third operation instruction based on the selection region, wherein the third operation instruction comprises a calibration algorithm identifier; and
- determining a target calibration algorithm corresponding to the calibration algorithm identifier according to the third operation instruction.

7. The method according to claim 1, wherein the camera calibration interface further comprises a setting control, and the method further comprises:
- displaying a setting interface in response to a second trigger operation on the setting control; and
- obtaining the configuration information based on the setting interface.

8. The method according to claim 7, wherein when the camera calibration process is used to calibrate a single camera, the setting interface comprises at least one of a description file name setting bar, a calibration target image file name setting bar, a file save path setting bar, an intrinsic parameter file name setting bar, an extrinsic parameter file name setting bar, a map file name setting bar, a thickness setting bar, a single-pixel width setting bar, a single-pixel height setting bar, a focal length setting bar, an average filter length and width setting bar, and a calibration target feature angle direction setting bar.

9. The method according to claim 7, wherein when the camera calibration process is used to calibrate dual cameras, the setting interface comprises at least one of a description file name setting bar, an intrinsic parameter file name setting bar of a first camera, an intrinsic parameter file name setting bar of a second camera, a map file name setting bar of the first camera, a map file name setting bar of the second camera, a calibration target height setting bar, a target object height setting bar, a calibration target center distance setting bar, an initial resolution setting bar, an edge removal percentage setting bar, an overlapping percentage setting bar, an average filter length and width setting bar, and a calibration target feature angle direction setting bar.

10. The method according to claim 1, wherein the camera calibration interface further comprises an image display region, and the image display region is used to display an image captured by the target camera and/or a calibration result image.

11. The method according to claim 1, wherein the camera calibration interface further comprises an image information display region, and the image information display region is used to display at least one of a logo, a pixel error, and a status of an image captured by the target camera.

12. The method according to claim 1, wherein the camera calibration interface further comprises a calibration result control; and the method further comprises:
- displaying a calibration result interface in response to a second trigger operation on the calibration result control, wherein the calibration result interface is used to display the calibrated parameter of the target camera.

13. A computer device, comprising a memory and a processor, wherein the memory stores a computer program, and the processor executes the computer program to implement the steps of a method according to claim 1.

14. A computer program product, comprising a computer program that, when executed by a processor, implements the steps of a method according to claim 1.

15. The method according to claim 1, wherein the configuration information comprises a file save path, and executing the corresponding operation in the camera calibration process comprises automatically saving a generated intrinsic parameter file, extrinsic parameter file, and map file in the file save path without manual intervention.

16. The method according to claim 1, wherein the configuration information comprises a calibration target feature angle direction, and the corresponding operation in the camera calibration process is performed in accordance with the calibration target feature angle direction.

17. The method according to claim 1, wherein the configuration information comprises both an average filter length and an average filter width, and the corresponding operation in the camera calibration process includes filtering an image based on the average filter length and width.

18. The method according to claim 1, wherein the camera calibration process is executed in the absence of a controller and drive mechanism for physically rotating a calibration object.

19. The method according to claim 4, further comprising:
- determining a pixel error of the image captured by the target camera;
- determining whether the pixel error is less than a preset pixel error threshold in the configuration information;
- deleting the image not meeting the preset pixel error threshold; and
- displaying, in an image information display region, the images meeting the preset pixel error threshold.

20. The method according to claim 19, wherein the camera calibration process is performed based only on the images meeting the preset pixel error threshold.

* * * * *